ELECTRIC DICTATION INSTALLATION

Filed Jan. 16, 1951 6 Sheets-Sheet 1

INVENTOR
John Edward Godeck
BY Rines and Rines
ATTORNEYS

Sept. 22, 1953 | J. E. GODECK | 2,653,190

ELECTRIC DICTATION INSTALLATION

Filed Jan. 16, 1951 | 6 Sheets-Sheet 2

INVENTOR
John Edward Godeck
BY Rines and Rines
ATTORNEYS

INVENTOR
John Edward Godeck
BY Kinesard Rines
ATTORNEYS

INVENTOR
John Edward Godeck
BY Pines and Pines
ATTORNEYS

INVENTOR
John Edward Godeck
BY Rines and Rines
ATTORNEYS

INVENTOR
John Edward Godeck
BY Rines and Rines
ATTORNEYS

Patented Sept. 22, 1953

2,653,190

UNITED STATES PATENT OFFICE 2,653,190

ELECTRIC DICTATION INSTALLATION

John Edward Godeck, Esher, England, assignor to Brecomin (England) Limited, Gillingham, England Application January 16, 1951, Serial No. 206,132
In Great Britain May 5, 1948

12 Claims. (Cl. 179—100.2)

This invention relates to electric recording and reproducing installations of the kind in which matter spoken into a microphone is recorded electro-magnetically on a wire or tape, and including take-off and take-up reels from one to the other of which the wire or tape is transferred in either direction by selectively driving the reels by means of an electric motor, a recording and reproducing head part which the wire or tape travels, the wire or tape moving past the recording and reproducing head in one direction, means being provided for reversing the direction of movement of the wire or tape and subsequently re-passing it through the recording and reproducing head in the normal direction for reproduction of the record as sound, together with electrical control means for starting, stopping and reversing the movement of the wire or tape, such electrical control means being actuated by a plurality of switches selectively operable by an operator.

An object of the invention is to provide an improved installation of the kind referred to, which is well adapted for receiving dictated material for subsequent reproduction by a typist. Another object of the invention is to provide an installation which can receive and record dictation from any one of a plurality of remote points, from any one of which the installation can be controlled.

According to the invention, in an electric recording and reproducing installation of the kind referred to first and second counting devices are provided the first of which is driven during any movement of the wire or tape in either direction and counts forwardly during forward movement of the wire or tape and backwardly during backward movement thereof, the second being driven only during rewinding of the wire or tape and subsequent forward movement of the rewound portion and counting forwardly during the rewinding movement and backwardly during the subsequent forward movement, the first counting device acting, when it reaches its zero position to operate switch means for reversing the driving motor and for energising the recording and reproducing head for reproduction, the second counting device acting, when it reaches its zero position, to operate switch means for stopping the driving motor, and means being provided for setting both of said counting devices to zero without movement of the wire or tape.

The invention is hereinafter described with reference to the accompanying drawings, in which.

Figure 1:
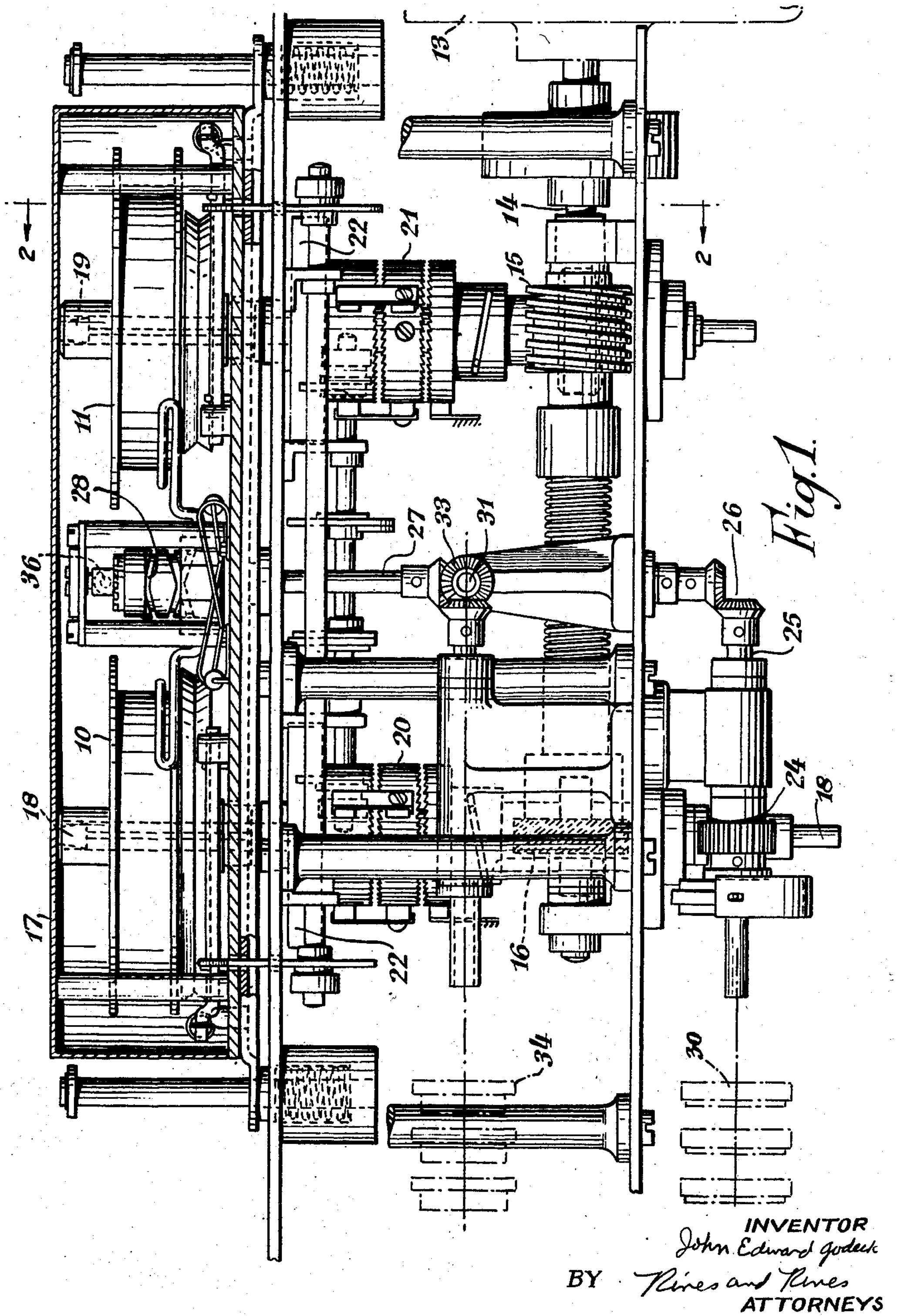
Figure 1 is a front elevation of one form of electric dictation installation according to the invention, the enclosing casing being omitted.

In the installation shown in Figures 1 to 5 of the drawings, a wire is fed from a take-off reel 10 on to a receiving reel 11 through a recording and reproducing head 12, the reels 10 and 11 being driven selectively in opposite directions by a single electric motor 13, the drive from which is transmitted through a main shaft 14 and worm gearing 15 to the reel 11, and through the said main shaft 14 and skew gearing 16 to the reel 10. The reels are mounted in a removable magazine 17, and engage, when the magazine is inserted in the installation, with driving spindles 18 and 19. Clutch means indicated at 20 and 21 serve to transmit the drive from the main shaft 14 to either the spindle 18 or the spindle 19, the clutch means being fully described in co-pending patent application No. 12,395/48, to which reference may be made for a full description of the driving means, it being understood that rotation of the shaft 14 in one direction causes the spindle 18 to be driven, and rotation of the shaft 14 in the other direction causes the spindle 19 to be driven. A brake drum 22 is associated with each of the spindles 18 and 19, its connection to the spindle being controlled by one way clutch means, and a pair of brake shoes, simultaneously operated so as to be released when the electric motor is started and applied when the electric motor is stopped, act one on each of the drums, the brake mechanism being fully described in co-pending patent application above referred to.

The reels 10 and 11 are arranged in the magazine as described in co-pending patent application No. 12,394/48, and the magazine is secured to the installation as described in that application. The recording and reproducing head 12 is mounted on the installation so as to project through an opening in the base of the magazine, the wire then lying in a groove in the said head.

Figure 2:
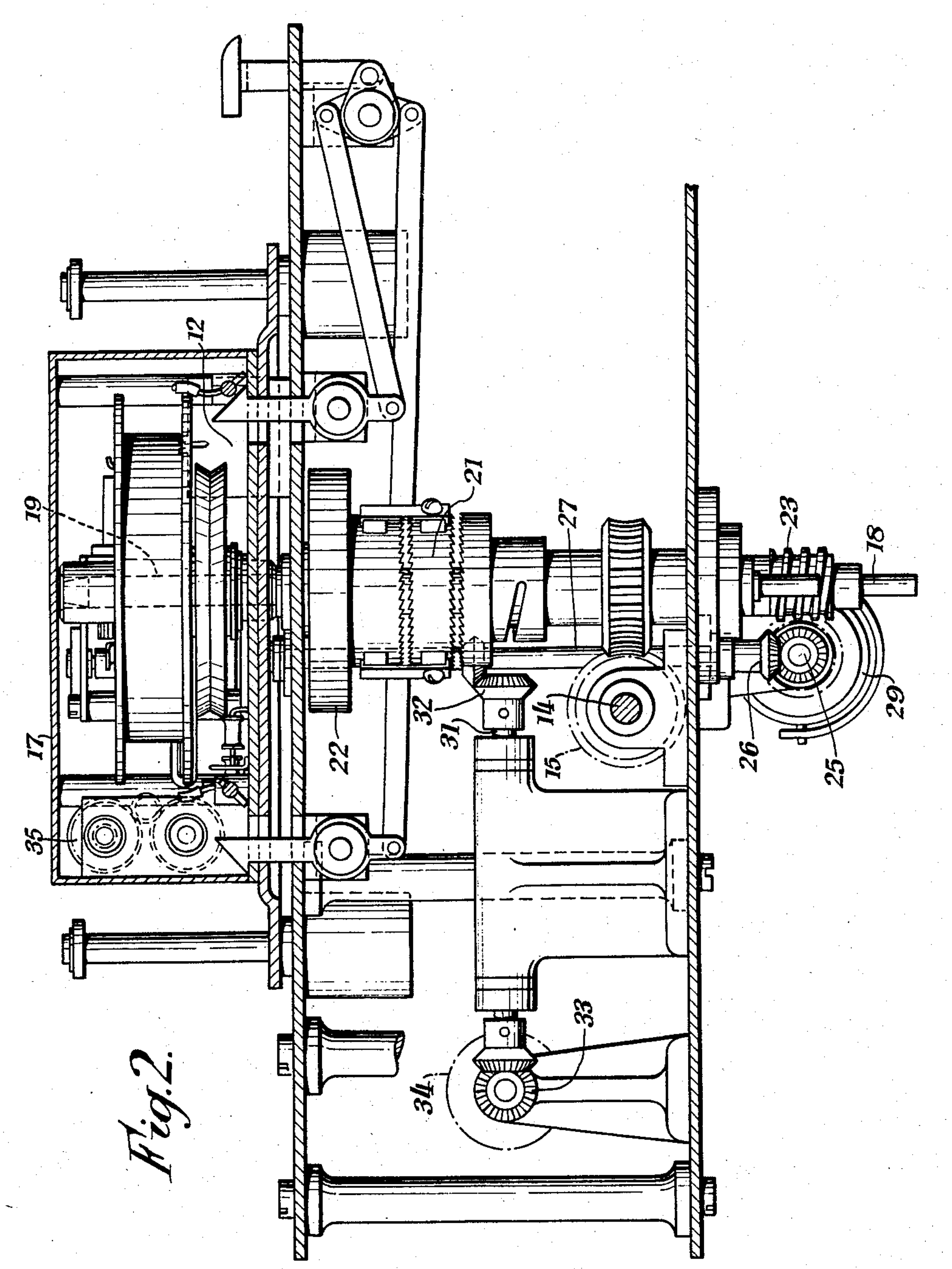
Figure 2 is a sectional side elevation on the line 2—2 of Figure 1.

The spindle 18 carries a worm 23, Figure 2, meshing with a worm-wheel 24 on a shaft 25 on which is mounted one wheel of a bevel gear train 26, Figure 2, through which is driven a shaft 27 which, when the magazine is in position, drives a cross-threaded worm 28 therein, Figure 1, as described in application No. 12,394/48, to operate wire guides in the magazine. The shaft 25 also drives through a dog clutch 29, see Figure 4, a cyclometer type counter 30 having three blank drums, the first of which completes a rotation in one minute, the second in ten minutes, and the third in 100 minutes, each drum being arranged to close an electric contact when in its zero or reference position, and maintain the said contact open in all other positions.

Figure 3:
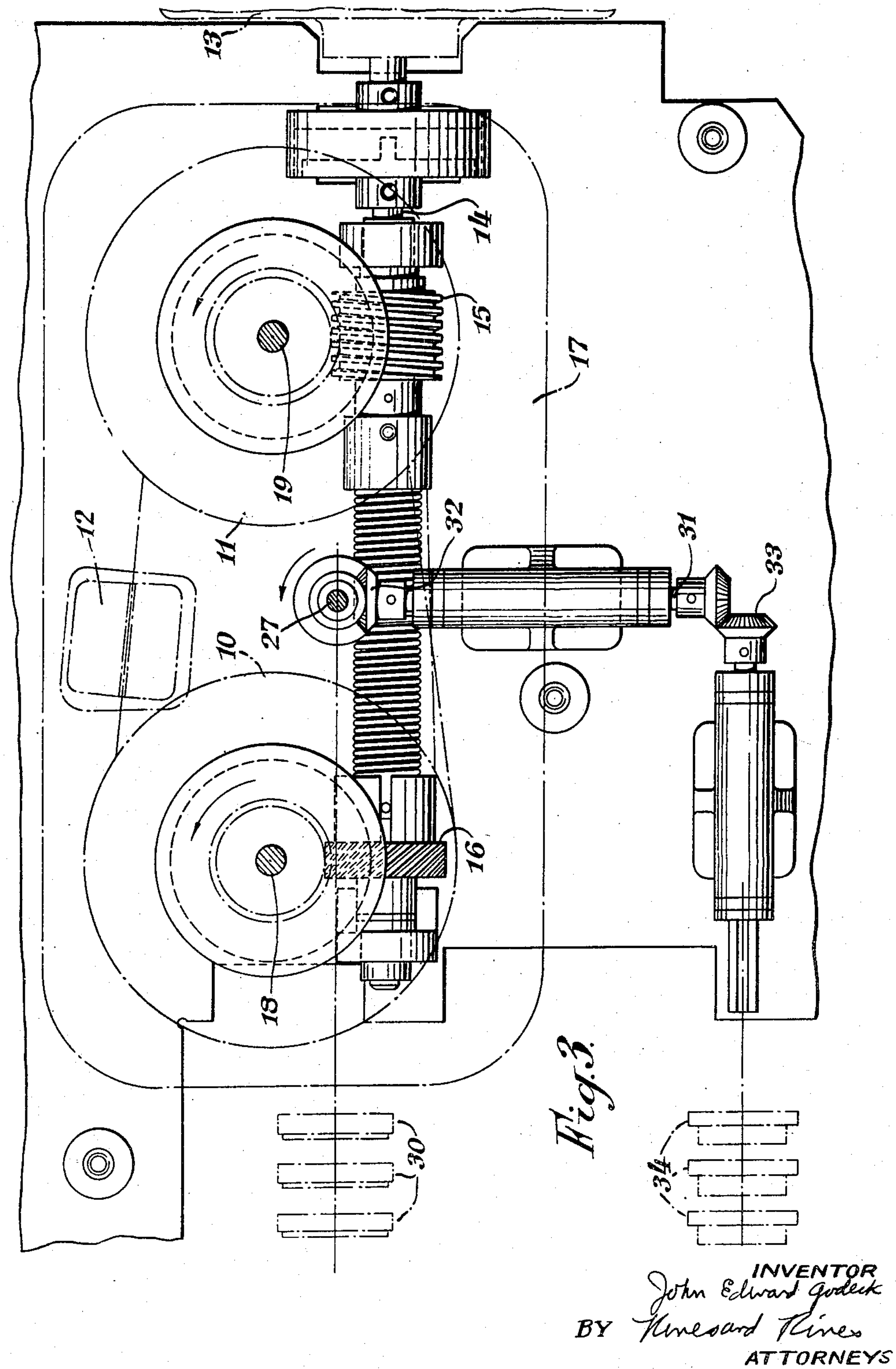
Figure 3 is a plan view of the installation shown in Figure 1 some parts being omitted.

The shaft 27 drives, through an intermediate shaft 31, Figure 2, and two bevel gear trains 32 and 33, Figure 3, a second cyclometer type counter 34, Figures 1 and 3, having drums rotating at the same speed as those of the counter 30 but bearing embossed figures indicating tenths of minutes, minutes and tens of minutes respectively, this counter, unlike the counter 30, being arranged so that each drum, when in its zero or reference position, permits the opening of two pairs of electric contacts, which contacts are closed when the drum is displaced from the zero position.

As the bevel gear trains 26, 32 and 33 have each a 1:1 ratio, the two counters 30 and 34 move at the same speed. A third cyclometer type counter 35, Figure 2, having markings similar to the counter 34 is provided in the magazine 17, and is driven through a flexible shaft 36 from the cross-threaded worm 28, this counter being driven at the same speed as the counters 30 and 34, and having a separate disc revolving with each of its drums, which disc is adapted, when the drum reads zero, to permit the closing of an electric contact. The "tens" drum of this counter also allows its contact to close when the said drum reads 50, so that the contacts controlled by this counter are all closed at the end of each 50 minutes. Figures on the counter 35 are visible through a window in the magazine.

Figure 4:
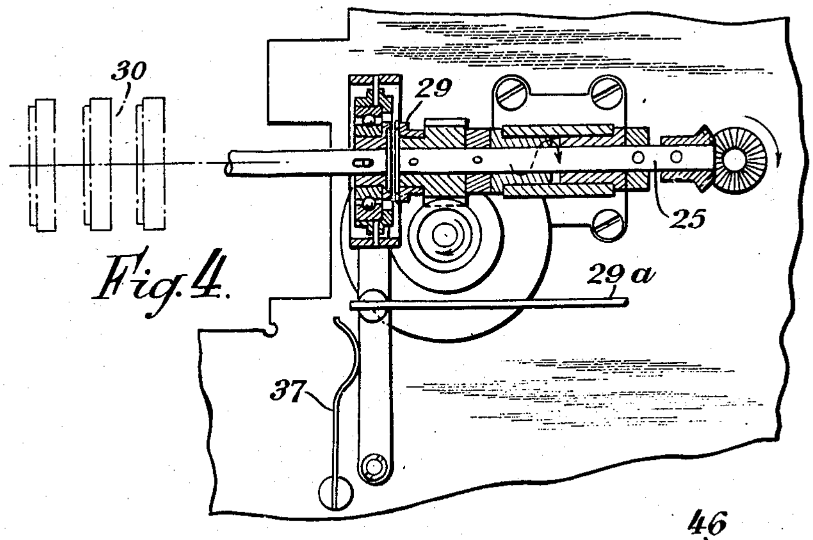
Figure 4 is a plan view of a detail of the mechanism.
Figure 5:
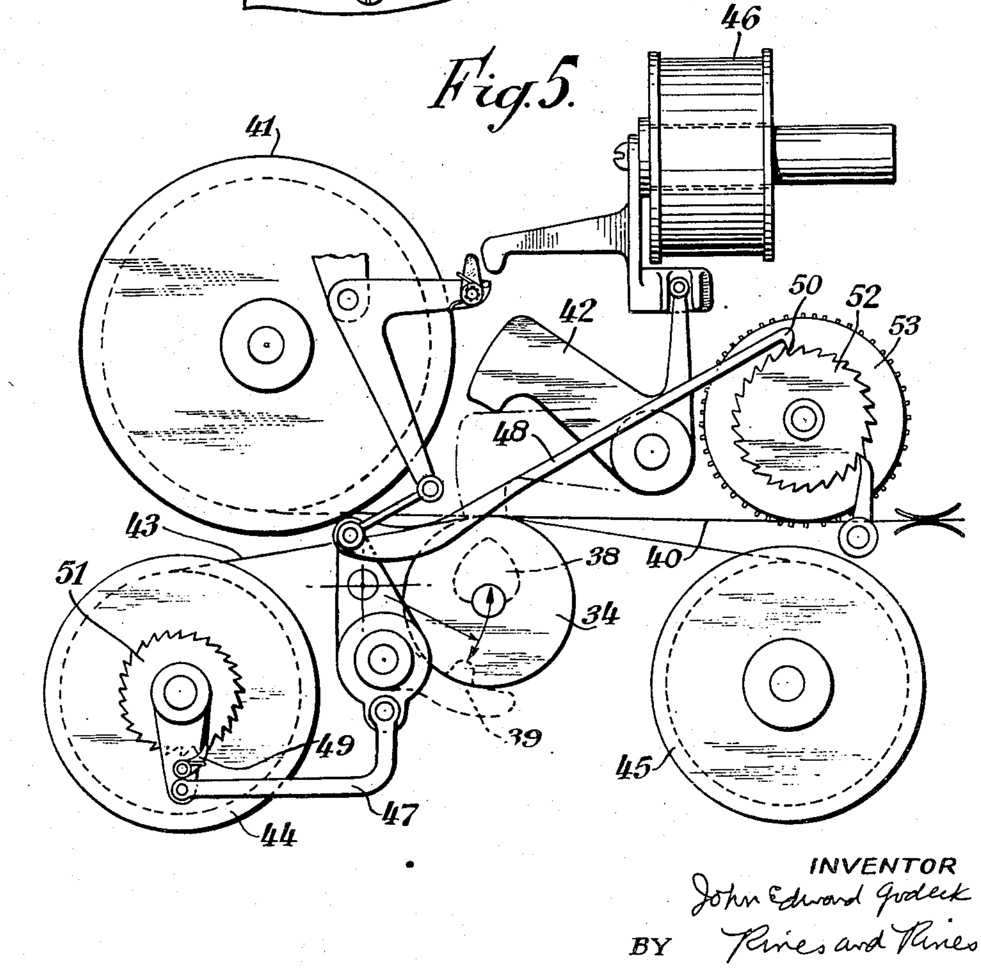
Figure 5 is an elevation of another portion of the mechanism.

The clutch 29, Figure 4, is spring-urged into the engaged position, by a spring 37, and is released by rod 29*a* acted upon by a solenoid (not shown in the mechanical drawings) which is the operating solenoid of one of the controlling relays of the installation, the clutch being released when the solenoid is energized, and engaged when the solenoid is de-energized. Since, as will appear below, this solenoid is energized during the recording of a message, the counter 30 is not driven during such recording. The counters 30 and 34 are zero-ised at the completion of each recording by mechanical zero-ising means shown diagrammatically in Figure 5, each counterdrum bearing a heart-shaped cam 38 on which is brought to bear a follower 39 in the known manner. Before the counters are set to zero, a printed record of the reading of the counter 34 is taken on a paper strip 40 which is wound off a reel 41 and fed outwardly through a slot in the housing of the installation, a hammer 42 pressing the paper strip 40 against an inked ribbon 43 which lies between the said strip and the counter drums. The ribbon 43 is carried on two reels 44 and 45. The hammer 42 and the zero-ising cam followers 39 are operated by a solenoid 46, the shaft on which the followers 39 are mounted carrying arms 47 and 48 connected to pawls 49 and 50 engaging ratchet wheels 51 and 52 on the ribbon reel 44 and on a paper strip feeding drum 53 respectively. Thus the paper strip and the inked ribbon are fed forward each time a record of the counter reading is taken.

Figure 6:
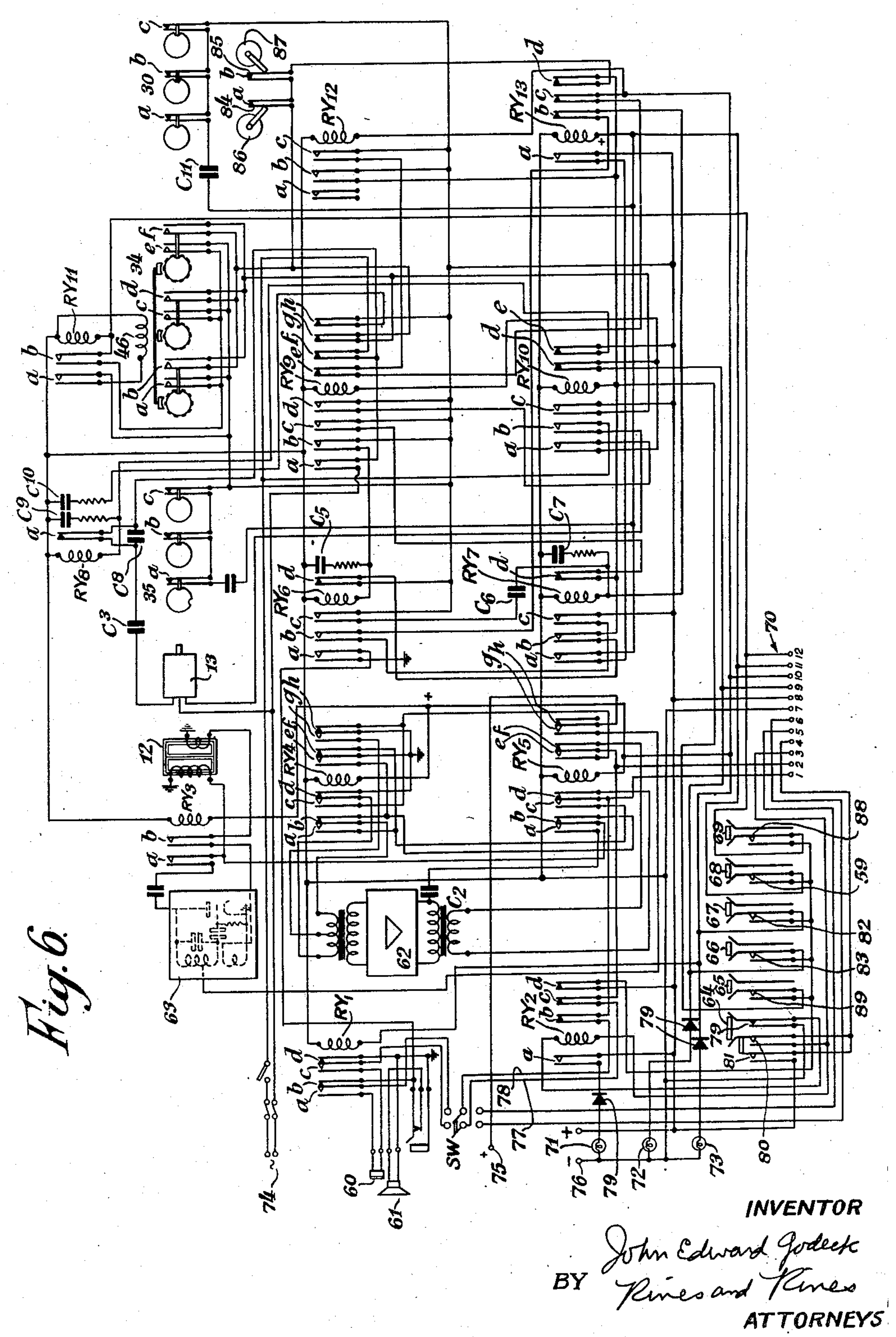
Figure 6 is a diagram showing the electrical circuits of the installation.
Figure 7:
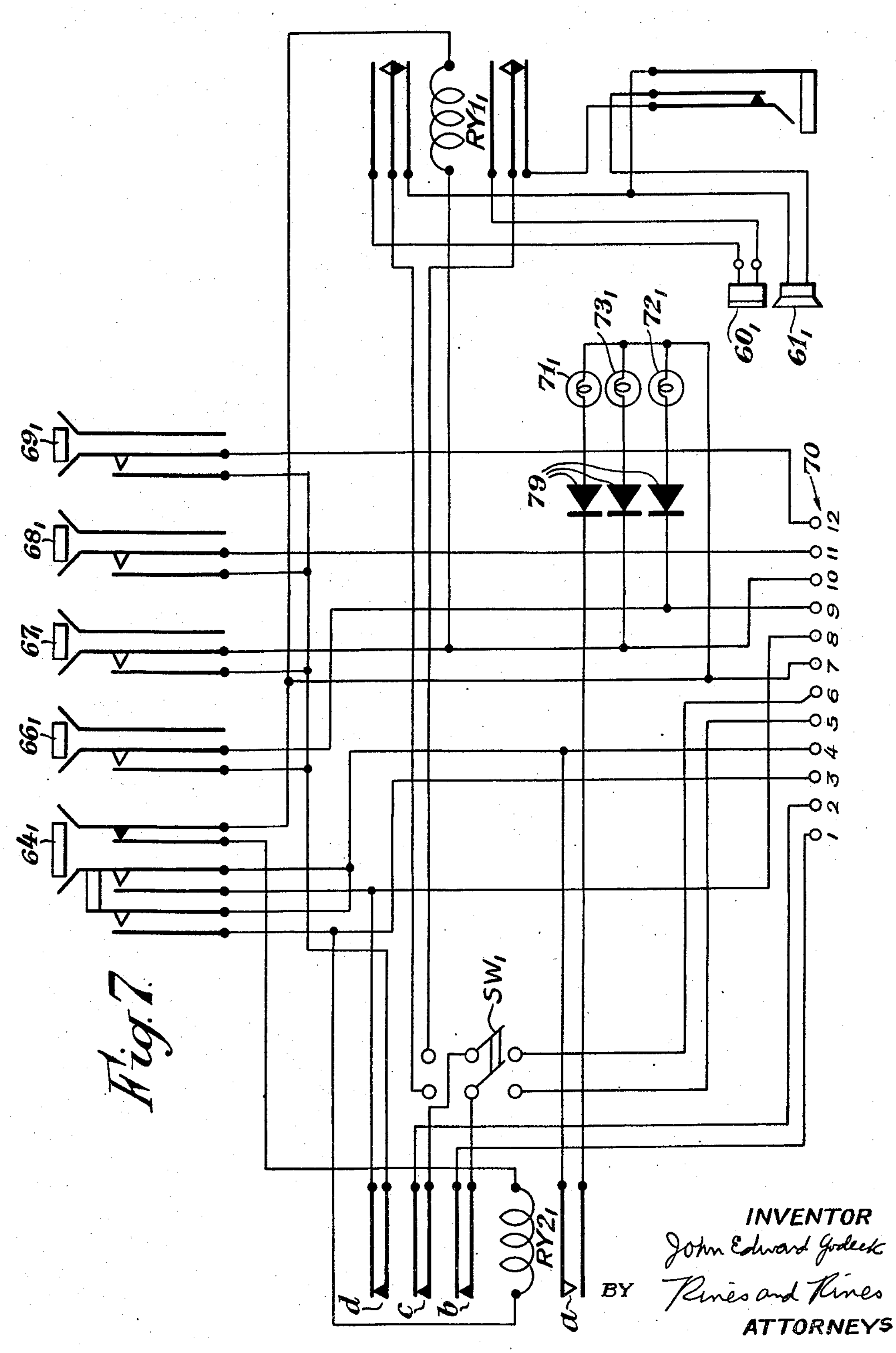
Figure 7 is a diagram showing the electrical circuit at a remote operating point.

The operation of the machine will now be described with reference to the electrical diagrams of Figures 6 and 7, Figure 6 showing the main installation and Figure 7 a remote operating unit.

Referring first to Figure 6, the recording and reproducing head 12, the electric motor 13, the three counters 30, 34 and 35, a microphone 60 and a loudspeaker 61 (which may be combined into a single instrument), an amplifier unit 62, a high frequency oscillator 63, and a bank of controlling push buttons 64, 65, 66, 67, 68 and 69 are shown together with a number of relays numbered RY1 to RY13, the relays actuating contacts to control the operation of the installation in accordance with the operation of the push buttons. The installation may also be remotely controlled from any one of a number of remote points at each of which (see Figure 7) are push buttons $64_1$, $66_1$, $67_1$, $68_1$, and $69_1$ corresponding to the push buttons 64, 66, 67, 68 and 69, a relay $RY1_1$ corresponding to the relay RY1, a relay $RY2_1$ corresponding to the relay RY2 and a microphone $60_1$ and loudspeaker $61_1$ corresponding to the microphone 60 and loudspeaker 61, the apparatus at the remote point being connected to the main installation by a ten-core cable attached to ten of the ways 1 to 4 and 7 to 12 of a twelve way connector indicated at 70. The remaining two ways 5 and 6 of the connector are connected to a telephone circuit so that recordings may be made of telephone conversations.

Signals lamps 71, 72 and 73 are provided at the main installation, and corresponding signal lamps $71_1$, $72_1$ and $73_1$ are provided at each remote point. Rectifiers 79 are provided in the circuits of the signal lamps to permit flow of current in only one direction in those circuits.

The installation is supplied with alternating current at 74 for driving the electric motor 13, with high tension current at 75 for supplying the oscillator 63, and with direct current at 76 for the control circuits.

The relay RY1 at the main installation, and the corresponding relays $RY1_1$ at the remote points, serve when the switch SW or $SW_1$ is in the upper position, to connect either the microphone or the loudspeaker to lines 77 and 78 leading, through the contacts $RY2_b$ and $RY2_c$ to contacts on the relay RY5. When the relay RY5 is de-energized, these lines are connected through contacts $RY5_d$ and $RY5_f$ to the secondary winding of the output transformer of the amplifier 62, and when the relay RY5 is energized, one of them is connected through contacts $RY5_c$ to contacts on relay RY4, contacts $RY4_a$ of which connect this line to one end of the primary winding of the input transformer of the amplifier when the relay is energized, whilst contacts $RY4_f$ earth the said line when the relay is de-energized. The other line is connected through contacts $RY5_c$ to other contacts on the relay RY4, being earthed through contacts $RY4_h$ when the said relay is de-energized and connected through contacts $RY4_c$ to the other end of the primary winding of the input transformer of the amplifier when the relay is energized. Contacts $RY4_g$ earth a centre tapping on the said primary winding when the relay RY4 is energized.

The relays RY10 and RY12, in addition to controlling electrical contacts perform mechanical work during the movement of their armatures, the relay RY10 which, when energized, starts the electric motor 13, serving also to release the brakes acting on the drums 22, whilst the relay RY12, which is energized only during recording, operates the clutch 29 as described above.

The following description of the operation of the installation deals with operation under the control of the push-buttons on the main installation, but operation from any of the remote points is similar. The first operation is to press the push-button 64 which opens a pair of contacts 79, and, an instant later, makes two pairs of contacts 80 and 81, all three contacts being series connected in the circuit of the relay RY2, contacts 80 and 81 being also in the circuits of the relays $RY2_1$ at the remote points, so that, through ways 3 and 7 of the twelve way connector, the pressing of push-button 64 energizes the relays $RY2_1$, but leaves de-energized the relay RY2. The relay RY2 when energized, by the operation of a push-button 64, in one of the remote units, closes contacts $RY2_a$ and opens contacts $RY2_b$, $RY2_c$ and $RY2_d$, the contacts $RY2_a$ being in the circuit of the signal lamp 71, and the contacts $RY2_b$, $RY2_c$ being in the microphone or loudspeaker circuit and the contacts $RY2_d$ in a common direct current supply line to the contacts operated by the remaining push-buttons, so that the energizing of this relay puts the microphone, loudspeaker, and push-buttons at the main installation out of action, and the illumination of lamp 71 indicates that a remote unit is being used, i. e., "engaged." Since the relays $RY2_1$ act in a similar manner to the relay RY2 to put out of action the microphone and push-buttons at the remote points, operation of the push-button 64 at the main installation renders all the said remote points inoperative, and lights up the lamps $71_1$ at those points, whilst leaving the main installation operative. The push-button 64 locks automatically in position when depressed. The relays RY2 and $RY2_1$ thus act as isolating relays to isolate all but one recording point from the main installation, the microphone-loudspeaker set at the main installation being regarded as one of the recording points.

To commence a recording, push-button 67 is pressed and released, the pressing of the button closing contacts 82 to complete a number of parallel circuits, through lamp 73 and relays RY1, RY3, RY4, RY5 and RY12. All of these circuits include the normally closed contacts $RY2_d$, and the closing of contacts $RY12_c$ when the relay RY12 is energized closes a path in parallel with that including the contacts 82 and $RY2_d$, said parallel path including also normally closed contacts $RY9_e$ and $RY13_d$. The closing of this parallel path maintains the said relays energized when the button 67 is released.

The closing of contacts $RY12_b$ due to the energization of the relay RY12 energizes relay RY10, closing contacts $RY10_b$ to complete a circuit through the motor 13 and start it rotating in one direction, the movement of the armature of relay RY10 releasing the brakes. The energizing of relay RY1 closes contacts $RY1_a$ and $RY1_c$, the energizing of relay RY5 closes contacts $RY5_c$ and $RY5_e$, and the energizing of relay RY4 closes contacts RY4 and $RY4_a$, the closing of these three pairs of contacts connecting the microphone 60 to the amplifier unit 62 as described above, through the normally closed contacts $RY2_b$ and $RY2_c$ of the relay RY2, and the switch SW. The contacts $RY5_a$ and $RY5_g$, also closed by the energising of relay RY5 respectively connect the recording winding of the recording and reproducing head 12 to the output of the amplifier unit, and connect the high tension supply to the oscillator 63. Contacts $RY3_a$ and $RY3_b$, closed by the energizing of relay RY3 connect the recording winding and the wipe-out winding of the recording head respectively to the high frequency oscillator 63, to apply bias to the recording winding and to render the wipe-out winding operative.

The installation is thus in a condition in which words spoken into the microphone are recorded magnetically on the wire, and remains in this condition, with the wire moving continuously past the recording head, until the push-button 68 is pressed, closing contacts 59 to energize relay RY13 which closes contacts $RY13_a$ and opens contacts $RY13_b$, $RY13_c$ and $RY13_d$. The opening of contacts $RY13_c$ breaks the circuit of relay RY12, thus opening contacts $RY12_b$ to break the circuit of the relay RY10, and opening the contacts $RY12_c$ to break the circuits of relays RY1, RY3, RY4, and RY5, the relay RY10 switching off the motor and applying the brakes.

The counters 34 and 35 have been driven during the recording, and both show the time, in minutes, taken to make the recording. The contacts controlled by the counter 35 are designated $35^a$, $35^b$, and $35^c$, whilst the contacts controlled by the counter 34 are designated $34^a$, $34^b$, $34^c$, $34^d$, $34^e$, and $34^f$. When the recording is stopped some or all of the contacts $35^a$, $35^b$ and $35^c$ are open depending on the time taken for the recording, whilst some or all of the contacts $34^a$, $34^b$, $34^c$, $34^d$, $34^e$, and $34^f$ are closed. The third counter 30 is at zero, the clutch through which it is driven having been disconnected, and contacts $30^a$, $30^b$ and $30^c$ actuated by the discs are closed.

To enable the recording to be played back to him, the operator presses button 66, closing contacts 83 to light lamp 72 and complete a circuit through normally closed contacts $RY10_d$ to energize relay RY9, closing contacts $RY9_a$, $RY9_b$, $RY9_c$ and $RY9_d$ and opening contacts $RY9_e$, $RY9_f$, $RY9_g$ and $RY9_h$. The closing of contacts $RY9_c$ completes a circuit through normally closed contacts $RY7_d$ to energize relay RY10, closing contacts $RY10_a$, $RY10_b$, and $RY10_c$ and opening contacts $RY10_d$ and $RY10_e$, the closing of contacts $RY10_b$ starting the motor, whilst the movement of the relay armature releases the brakes. Contacts $RY10_c$ complete a circuit through relay RY10 including contacts $34^b$, $34^d$ and $34^f$ (or such of those contacts as are closed), contacts $RY13_d$, and further contacts 84 and 85 held closed by devices 86 and 87. These are so arranged that the device 86 or 87 which is controlled by the reel which is for the time being the take-off reel maintains its corresponding contact closed so long as a torque is applied to the reel due to the tension of the wire; should the wire break and the torque cease to exist the contact will open. The relay RY10 thus remains energised when the push button 66 is released, as also does the relay RY9, the circuit through which is kept closed by its own contacts $RY9_d$ and the contacts $RY10_a$. The closing of contacts $RY9_b$ energises relay RY6 to close contacts $RY6_a$, $RY6_b$, and $RY6_c$, and to open contacts $RY6_d$, the closing of contacts $RY6_c$ energising the relay RY7 to close contacts $RY7_a$, $RY7_b$, and $RY7_c$, and open contacts $RY7_d$. The loudspeaker 61 is short-circuited by the contacts $RY6_a$ and is therefore inoperative.

The opening of contacts $RY9_f$ and the closing of contacts $RY9_a$ due to the energisation of relay RY9 reverses the direction of rotation of the motor 13, which is of the capacitor type.

The motor now runs in the opposite direction, and rewinds the wire on the take-off spool, the spools being rotated at a higher speed than when moving forwardly, and all three counters 30, 34 and 35 are driven, the counters 34 and 35 moving backwardly, and counter 30 forwardly. This continues until the counter 34 reaches the zero position, when the contacts $34^b$, $34^d$ and $34^f$ are all open and the circuit of the relay RY10 is broken, thus stopping the motor and applying the brakes. The counter 30 now reads the same as did the counter 34 when the recording ceased, and the contacts $30^a$, $30^b$ and $30^c$ are open. The de-energising of relay RY10 opens contacts $RY10_a$, causing relay RY9 to become de-energised and opens contacts $RY9_b$ to open the circuit of relay RY6 the release of which is delayed for a short period by the discharging of the condenser C5. When the relay RY6 is released the contacts $RY6_d$ are closed to complete a circuit through contacts $RY7_b$ and the relay RY10, which is thus re-energized to start the motor 13 in the forward direction and release the brakes. The relay RY10 is held closed regardless of the position of relays RY6 and RY7, as the closing of contacts $RY10_c$ completes the parallel circuit through contacts $RY10_c$, $RY9_g$ and $RY13_d$ and the contacts 84 and 85. The relays RY1, RY3, RY4 and RY5 are now de-energized, so that the loudspeaker is connected through contacts $RY1_b$ and $RY1_d$, $RY5_d$ and $RY5_f$ to the amplifier the contacts $RY3_a$ and $RY3_b$ are open so that the recording and wipe-out windings of the recording head are disconnected from the oscillator, contacts $RY5_g$ are open so that there is no high tension applied to the oscillator, and contacts $RY5_b$ and $RY4_a$ connect the recording winding of the recording head to the amplifier.

The wire now runs forwardly through the recording head, and the recorded material is heard in the loudspeaker, this operation continuing until the counter 30 reaches zero, closing the contacts $30^a$, $30^b$ and $30^c$ (or such of them as were open), and charging a condenser C11 which produces a current impulse in relay RY13, thus energising the said relay for a long enough period to open the contacts $RY13_b$, $RY13_c$ and $RY13_d$, and so de-energizing relays RY4, RY5, RY7 and RY10 so that the motor is stopped, the brakes are applied, and the connections between the recording head and the loudspeaker are broken. The counter 34 is now again at a position indicating the time taken for the recording.

The push button 69 is now pressed, releasing the push-button 64 through a mechanical interlock, and closing contacts 88 to energise relay RY11 which closes contacts $RY11_a$ and $RY11_b$, the latter contacts, in series with contacts $34^a$, $34^c$ and $34^e$ (or such of them as are closed) completing a holding circuit for that relay. Contacts $RY11_a$ complete the circuit through the solenoid 46 which first actuates the hammer to apply the paper strip and inked ribbon to the type figures of the counter 34 to provide a printed record of the message time, and then advances the paper strip and inked ribbon, and zeroises the counters 30 and 34. The counter 35 remains at the reading shown at the completion of the recording, and adds to this the reading for the next recording.

The push button 65, when depressed, closes contacts 89 which energize the relay RY10 to permit forward running of the wire without the recording apparatus being operative, so that the record can be heard. If this button 65 is pressed after the button 69 has been pressed to zeroise the counter 34, the machine runs forwardly until stopped, but will run back again if the button 66 is subsequently pressed, without reversing when the counter 34 reaches zero, since counter 30 simultaneously reaches zero and provides an impulse to operate the relay RY13.

In the above description, it has been assumed that the counters are operated mechanically, but they may be operated electrically by means of a solenoid energized intermittently through cam-operated contacts. Such counters could be employed at the remote units as well as at the main installation, and the counter 30 could then be connected and disconnected electrically instead of mechanically.

The remote units do not include a push button equivalent to the button 65 at the main installation. Modified remote units may be provided for transcription purposes which are provided with a push button corresponding to 65 to provide continuous forward running, and no button corresponding to 67, which sets the installation for recording. Such a unit may be provided with an alternative push button acting to reverse the wire for a short predetermined period (by energizing the relay RY9), and then reverting to forward running.

The electric motor 13 has two terminals each connected to one pole of the supply, and a third terminal connected to either pole of the supply through a condenser C3 and the contacts $RY9_a$ or $RY9_f$ to cause the motor to run in one or the other direction. Another condenser C8 is arranged in series with the condenser C3 and is short-circuited by contacts $RY8_a$ opened by energization of relay RY8, which relay is energized when the motor is stationary, and is de-energized when the motor is started, by the opening of contacts $RY10_e$ the de-energizing of the relay being delayed by the discharge of a condenser C9. Contacts $RY9_h$, which are opened when the motor is started in the reverse direction, cause another condenser C10 to discharge simultaneously with the condenser C9, thus reducing the delay in de-energization of the relay RY8 when the motor is started in reverse. The condenser C8 serves to reduce the capacity in the motor supply line, and thus provides a low power start.

The switch SW provided in the main installation, and similar switches $SW_1$ provided at the remote points, enable the installation to be used to record telephone conversations, the electrical impulses in the telephone circuit being applied directly to the amplifier instead of the impulses produced by speech into the microphone.

I claim:

1. In an electric recording-and-reproducing installation provided with rotatable wire or tape-holding take-off and receiving reels and a wire or tape recording-and-reproducing head, the combination of means selectively operative for rotating the receiving reel to receive the wire or tape from the take-off reel during recording or reproducing and for rotating the take-off reel to rewind the wire or tape from the receiving reel, a first counting device, means for coupling the rotating means to the first counting device to drive the first counting device forward during the recording from a reference position to a predetermined position representative of the length of the recording and backward during the rewind from the predetermined position to the reference position, a second counting device, means for rendering the second counting device ineffective during the recording, means for coupling the rotating means to the second counting device to render the second counting device effective upon commencement of the rewind to count forward from a reference position during the rewind and backward during the reproduction, the first and second counting devices counting at the same speed, first switching means, means controlled by the first counting device for actuating the first switching means when, during rewind, the first counting device registers its reference position, an electric circuit controlled by the actuated first switching device for causing the rotating means to thereupon rotate the receiving reel and simultaneously to energize the recording-and-reproducing head for reproduction, second switching means, means controlled by the second counting device for actuating the second switching means when, during reproduction, the second counting device registers its reference position, and an electric circuit controlled by the actuated second switching device for thereupon stopping the rotating means.

2. An installation as claimed in claim 1 and in which means is provided for setting the first and second counting devices to their reference positions without movement of the wire or tape.

3. An electric recording and reproducing installation according to claim 1 wherein the first counting device carries figures which co-operate with printing mechanism to provide a printed record of the length of a recording.

4. An electric recording and reproducing installation according to claim 1 having manually controlled switch means for starting the rotating means to rotate the receiving reel, and for energizing the recording and reproducing head for recording, further manually controlled switch means for stopping the rotating means and de-energizing the recording head, and still further manually controlled switch means for starting the rotating means to rotate the take-off reel and for initiating the operation of the second counting device.

5. An electric recording and reproducing installation according to claim 3 wherein additional manually controlled switch means are provided for initiating the action of the printing mechanism and the resetting to their reference positions of the counting devices.

6. An electric recording and reproducing installation according to claim 4, wherein the manually controlled switch means includes manually operated switches of the self-opening type the closing of which energize relays, holding contacts being provided to maintain the circuits closed when the switches are opened.

7. An electric recording and reproducing installation as claimed in claim 1, wherein means are provided which prevent operation of the said installation in the event of breakage to the tape or wire.

8. An electric recording and reproducing installation according to claim 1, wherein the wire or tape is adapted to record words received by any one of a plurality of microphones located at spaced recording points and to repeat recorded material at the same recording point, means for controlling the installation being provided at each recording point.

9. An electric recording and reproducing installation according to claim 8, wherein at each recording point there is provided an isolating relay controlling contacts through which the microphone and loudspeaker at that recording point are connected to the recording and reproducing system, each said relay being energized by the operation of a starting switch at any other recording point to disconnect the said microphone and loudspeaker from the recording and reproducing system.

10. An electric recording and reproducing installation according to claim 9, wherein operation of the starting switch at any recording point illuminates signal lamps at all the other recording points.

11. An electric recording and reproducing installation according to claim 9, wherein the isolating relays remain energized after operation of a starting switch until they are de-energised by the operation of a second switch operation of which also causes the setting at the reference positions of the first and second counting devices.

12. An electric recording and reproducing installation according to claim 1, wherein wipe-out means are provided which are in operation at all times when the recording and reproducing head is energised for recording, the wire or tape passing the wipe-out means before it reaches the point at which the record is applied thereto.

JOHN EDWARD GODECK.

References Cited in the file of this patent

UNITED STATES PATENTS

| Number | Name | Date |
|---|---|---|
| 1,237,496 | Frankhouser | Aug. 21, 1917 |
| 1,883,560 | Chipman | Oct. 18, 1932 |
| 2,540,299 | Shoup | Feb. 6, 1951 |